Figure 1:
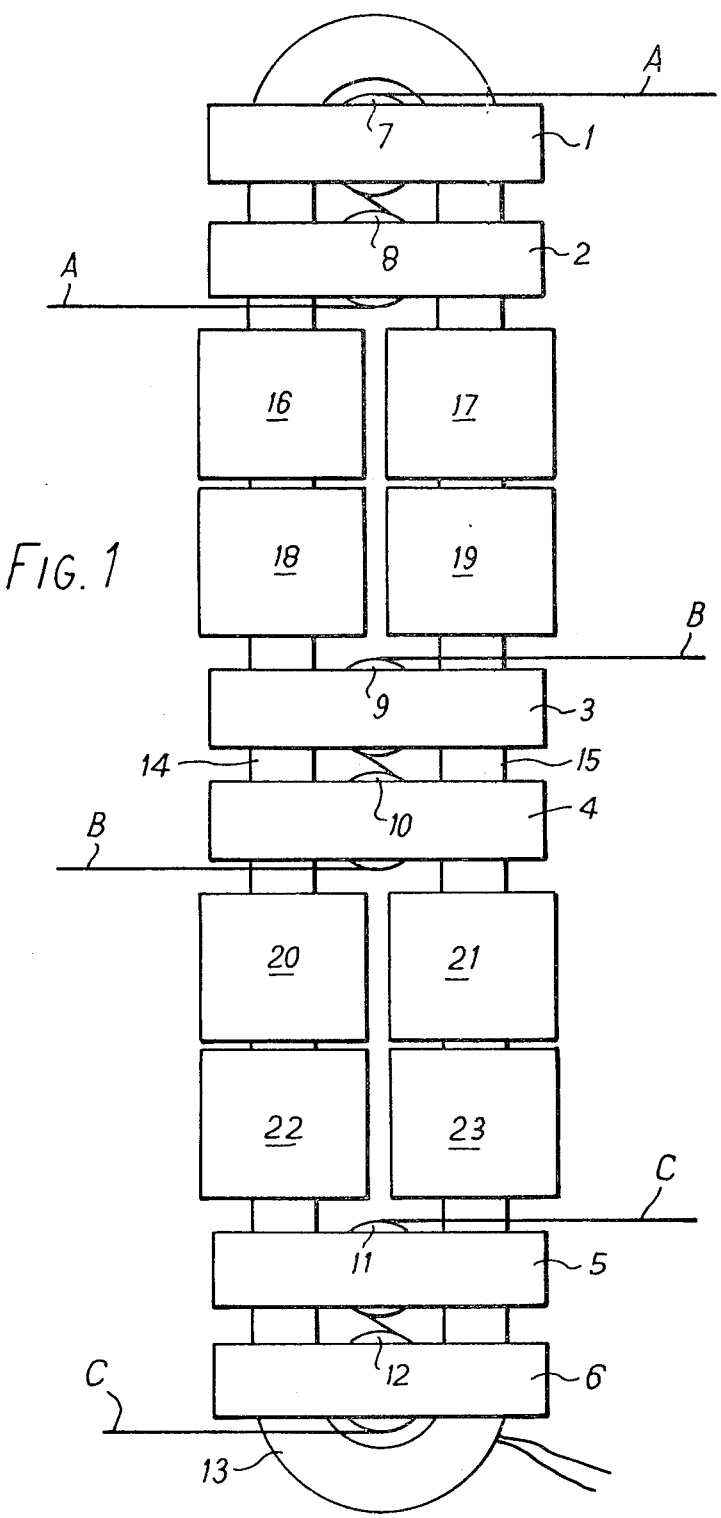

United States Patent [19]

Bartram et al.

[11] 4,257,080
[45] Mar. 17, 1981

[54] CURRENT LIMITING DEVICES

[76] Inventors: Trevor C. Bartram, Fossway, Newcastle upon Tyne NE6 2YD, England; Bendapudi P. Raju, NEI Bruce Peebles Ltd., East Pilton, Edinburgh, Scotland, EH5 2XT

[21] Appl. No.: 46,766

[22] Filed: Jun. 8, 1979

[30] Foreign Application Priority Data

Jun. 13, 1978 [GB] United Kingdom ............... 26841/78

[51] Int. Cl.³ .............................................. H02H 3/08
[52] U.S. Cl. ...................................... 361/19; 323/360; 361/58
[58] Field of Search ........................ 361/19, 58; 323/9

[56] References Cited

U.S. PATENT DOCUMENTS

| | | | |
|---|---|---|---|
| 3,691,491 | 9/1972 | Massar et al. ...................... | 361/19 X |
| 4,015,168 | 3/1977 | Massar ..................................... | 361/19 |
| 4,045,823 | 8/1977 | Parton ..................................... | 361/58 |
| 4,117,524 | 9/1978 | Parton et al. ......................... | 361/19 |

Primary Examiner—Harry E. Moose, Jr.
Attorney, Agent, or Firm—Robert F. O'Connell

[57] ABSTRACT

A current-limiting device for an alternating current system has at least two iron-cored saturable reactors for each phase, each reactor core being of double-window configuration with an alternating current winding on the central limb, and a superconducting bias winding screened alternating magnetic flux is in the form of a loop with two parallel sides which pass through the two windows of at least two of the reactor cores. For a three phase system the three pairs of reactors may be on a single bias winding loop or each pair may have its own bias winding. In a preferred construction two bias winding loops each link three reactor cores and each phase includes one reactor from each of the bias windings.

6 Claims, 3 Drawing Figures

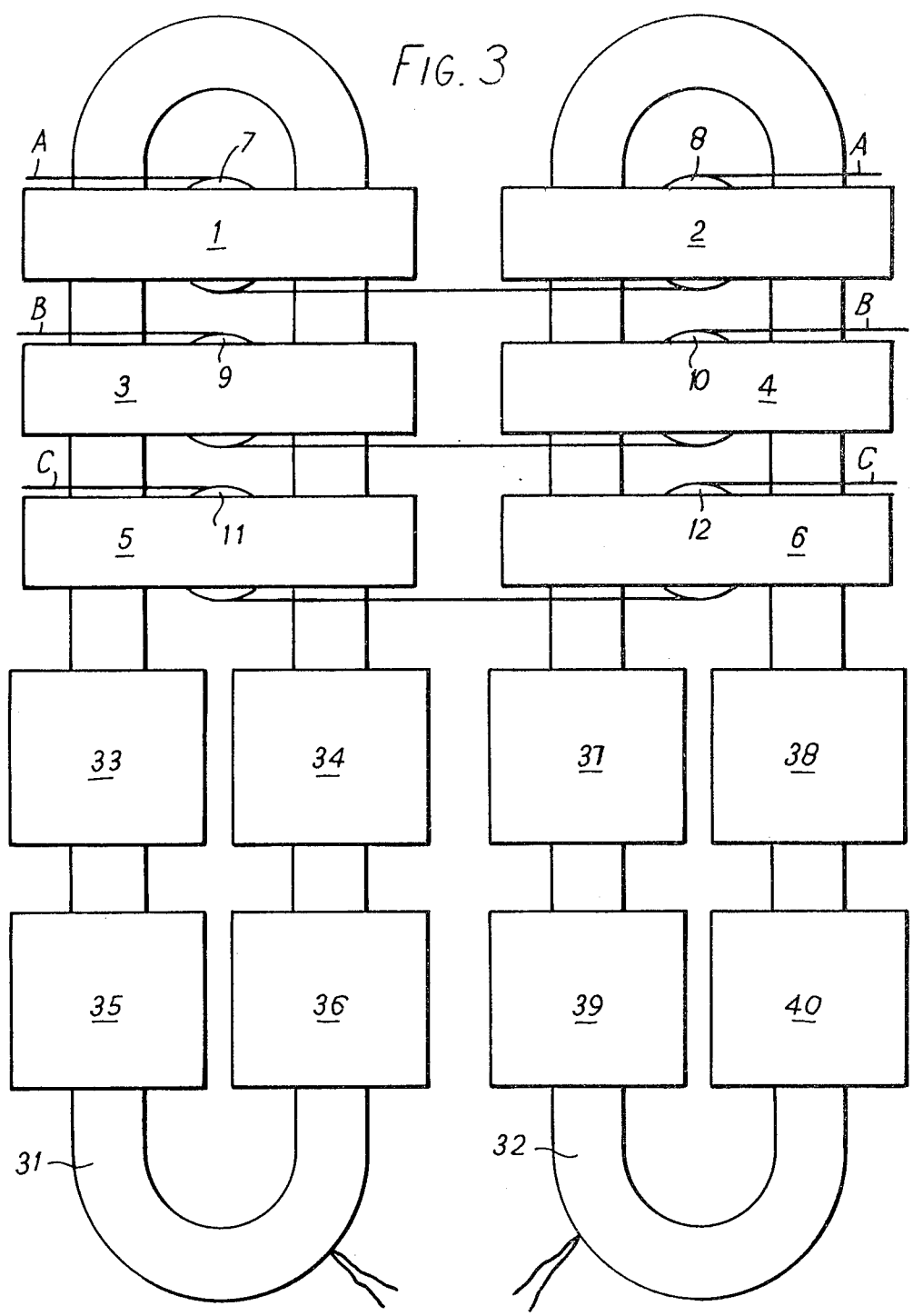

CURRENT LIMITING DEVICES

This invention relates to current limiting devices for use in connection with alternating current systems.

U.S. Pat. No. 4,045,823 dated Aug. 30, 1977 describes a current limiting device for an alternating current system in which saturable reactors carrying windings connected to the alternating current system are magnetically linked with a superconducting direct current bias winding capable of magnetically saturating the reactors. It also describes various ways in which such a current limiting device can be used. U.S. Pat. No. 4,117,524 dated Sept. 26, 1978 describes a modified form of current limiting device having a screen of electrically-conductive material surrounding the bias winding to shield the bias winding against alternating magnetic flux.

The present invention is concerned with improvements in the magnetic circuit arrangements for a current limiting device having a screened superconducting bias winding as described in U.S. Pat. No. 4,117,524. One object of the invention is to provide improved magnetic coupling between the superconducting bias winding and the alternating current winding. In preferred embodiments described in the two U.S. Patents the superconducting bias winding is linked with one or more airgap magnetic cores. In a multi-phase system the quantity of magnetic material required for the air-gap cores and for the reactor cores is such as to constitute a severe restriction on the design of the current-limiting device because of the resulting size and weight and the cost of the magnetic material. It is therefore another object of the invention to provide a magnetic circuit for the current limiting device which enables these design constraints to be overcome.

In accordance with the invention there is provided a current-limiting device for an alternating current system comprising for each phase at least two iron-cored saturable reactors each of three limbed, double window configuration with an alternating current winding of that phase wound about its centre limb, there being provided at least one superconducting direct current bias winding of elongated closed-loop configuration, the loop extending substantially in one plane and having two substantially parallel sides, at least one air-gap magnetic core linking each superconducting bias winding and a screen of electrically-conductive material surrounding the bias winding to shield the bias winding against alternating magnetic flux, and the arrangement being such that one of the two parallel sides of the loop of each screened bias winding passes through aligned windows of two of the iron-cored saturable reactors which are spatially parallel to one another while the other of the parallel sides passes through the other windows of the said two reactors.

In one embodiment of the invention a single bias winding is associated with three pairs of saturable reactors, one pair serving each phase of a three-phase system. The air-gap cores are disposed between the pairs of reactors. In a second embodiment each phase has its own bias winding associated with a pair of saturable reactors and several air-gap magnetic cores. In a third embodiment, which in certain circumstances is preferred for a three-phase system, the saturable reactors are in two sets of three, each set having a bias winding common to the three reactors, and each phase contains one reactor from each set.

The invention will now be described in more detail with the aid of examples illustrated in the accompanying drawings, in which:-

Figure 2:
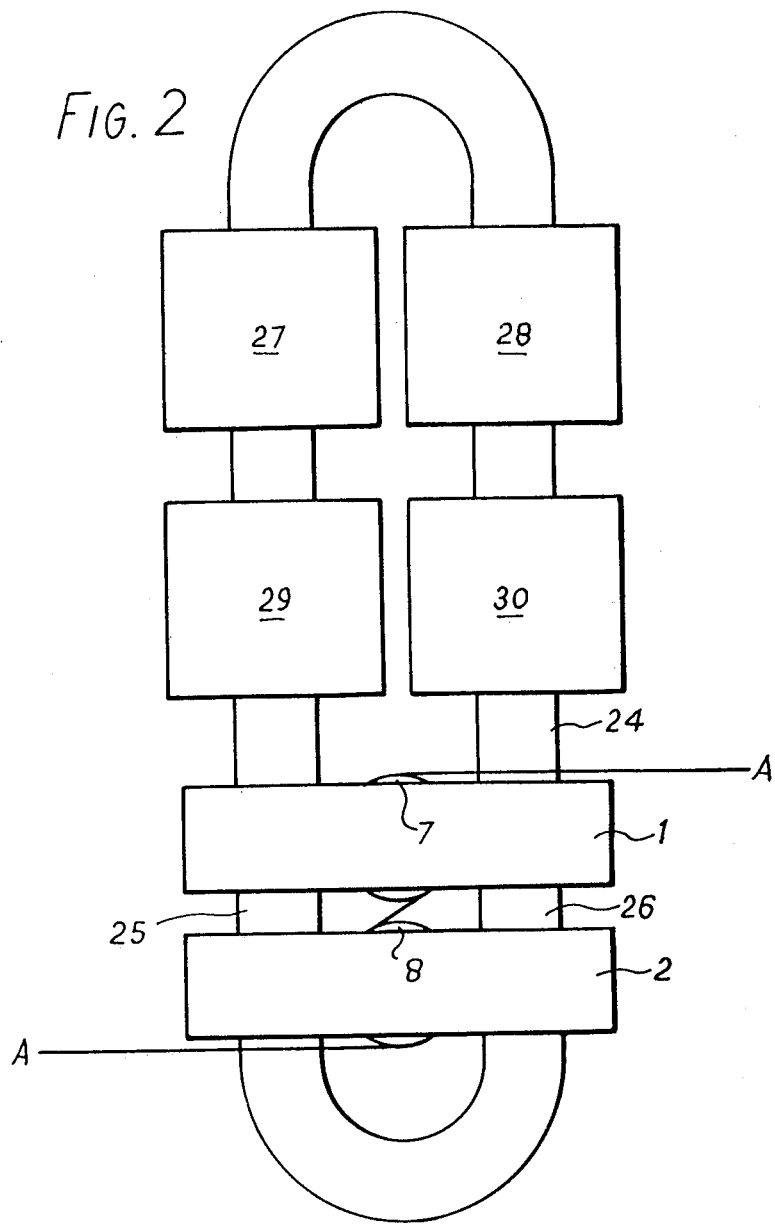

FIG. 1 is a schematic plan view of a first embodiment of a current-limiting device in accordance with the invention for a three phase system, FIG. 2 is a schematic plan view of a second embodiment of a current-limiting device in accordance with the invention showing the parts required for a single phase, and FIG. 3 is a schematic plan view of a third embodiment of the invention for use in a three phase system.

Constructional details of the saturable reactors and the bias winding with its screen have been omitted from the drawings to enable the essential features of the present invention to be shown with greater clarity.

The constructional details are shown in U.S. Pat. No. 4,117,524, to which reference may be made for additional description.

Referring first to FIG. 1, the fault limiting device shown is applied to a three-phase system comprising three supply, or interconnecting, phase lines A, B and C.

The device comprises six iron-cored saturable reactors 1 to 6 each of which is of three-limbed, double window configuration, this configuration not being apparent from the drawings since the limbs of the reactors are vertically oriented. Each phase line is associated with two of the reactors 1 to 6 in that the two reactors associated with a line each have an alternating current winding and the two windings are connected in series with each other in the line. Thus the two windings associated with phase line A are windings 7 and 8 wound on the centre limbs of reactors 1 and 2 respectively. Similarly, windings 9 and 10 are wound on the centre limbs of saturable reactors 3 and 4 in the B phase line, and windings 11 and 12 are wound on the centre limbs of saturable reactors 5 and 6 in the C phase line.

A shielded superconducting direct current bias winding 13 of elongated loop configuration is arranged to traverse the windows of saturable reactors 1 to 6, as shown. One side 14 of the parallel-sided loop of superconducting winding and shielding 13 passes through parallel opposed windows to the left of the central limbs of saturable reactors 1 to 6 whilst the return side 15 passes through similarly disposed windows to the right of the central limbs of the reactors as viewed in FIG. 1.

The current-limiting device is further provided with air-gap magnetic cores 16 to 23 each linking the bias winding 13. The air-gaps in cores 16 to 23 are not visible in the plan view of FIG. 1.

The superconducting direct current bias winding 13 is capable of maintaining the saturable reactors saturated under full load conditions on the alternating current system lines A, B and C, the material of its shielding being electrically-conductive to protect the superconducting winding against alternating magnetic flux. The alternating current windings of each phase, such as windings 7 and 8 of phase A, are so arranged and connected that under full load conditions a change in the level of saturation in any one saturable reactor relative to the bias level due to the bias winding is accompanied by a compensating change in saturation level in another saturable reactor or reactors, current limiting occurring under fault conditions, when the saturable reactors of a phase are alternately forced out of saturation on successive half-cycles (see U.S. Pat. No. 4,045,823).

The air-gap magnetic cores 16 to 23 serve to increase the sel-finductance of the direct current bias winding 13, thus considerably reducing the physical dimensions of a superconducting bias winding which would be required in the absence of such air-gap cores.

The adoption of saturable iron-cored reactors of three limb configuration with an alternating current winding wound on the central limb considerably enhances the degree of magnetic coupling between the superconducting bias winding and the system alternating current windings, so enabling the design of devices capable of limiting fault current to a lower level than could be attained with previously disclosed arrangements.

The design of particular current limiting devices for three-phase systems in accordance with the invention may be conditioned by the requirements for fault protection on the system. For example, the design of a fault limiter may not be so stringent if only symmetrical faults are to be guarded against on a particular system.

In the embodiment of the invention shown in FIG. 2, the quantity of air-gap magnetic core material required for protection against symmetrical faults only is comparable with that for the embodiment shown in FIG. 1, but construction and transport problems and civil engineering costs may be reduced by the introduction of two further direct current superconducting bias windings.

Referring to FIG. 2, one third only of the current limiting device is shown as applied to the A phase of a three-phase alternating current system. Two further units of the limiting device applicable to the B and C phases and identical with the A phase are not shown.

The portion of the device shown in FIG. 2 comprises two iron-cored saturable reactors 1 and 2 carrying alternating current windings 7 and 8 respectively of phase A of the system wound about their centre limbs. A shielded superconducting direct current bias winding 24 passes through the windows in reactors 1 and 2, one side 25 of the elongated loop-shaped winding 24 passing through windows to the left of the centre limbs of the saturable reactors and the return side 26 passing through windows to the right of the centre limbs of the reactors. Air-gap magnetic cores 27 to 30 are provided to link the bias winding 24.

The arrangement of the device shown in FIG. 2 may prove unsuitable if asymmetric faults on a system are to be guarded against, since it requires a comparatively large amount of air-gap magnetic core material relative to the arrangement shown in FIG. 1. An arrangement for providing against asymmetric faults whilst not demanding the amount of air-gap core material which the FIG. 2 arrangement would require but retaining some of the latter arrangements design advantages is shown in FIG. 3.

Referring to FIG. 3, the current limiting device shown for a three-phase system requires only two superconducting direct current bias windings 31, 32 as opposed to the three such windings in the device described with respect to FIG. 2. Air-gap magnetic cores 33 to 40 link the bias windings, cores 33 to 36 linking bias winding 31 and cores 37 to 40 linking bias winding 32.

The current limiting device shown in FIG. 3 differs from that shown in FIGS. 1 and 2 in that, not only are an intermediate number of superconducting bias windings required, but also the two alternating current windings associated with each phase are wound about the centre limbs of two saturable iron-cored reactors each of which is linked by a different superconducting bias winding. Thus winding 7 of the phase A line is wound on the centre limb of core 1 which is linked by superconducting bias winding 31, whereas winding 8 of the same phase A line is wound on the centre limb of core 2 which is linked by superconducting bias winding 32.

We claim:

1. A current-limiting device for an alternating current system comprising for each phase at least two iron-cored saturable reactors each of three limbed, double-window configuration with an alternating current winding of that phase wound about its centre limb, there being provided at least one superconducting direct current bias winding of elongated closed-loop configuration, the loop extending substantially in one plane and having two substantially parallel sides, at least one air-gap magnetic core linking each superconducting bias winding and a screen of electrically-conductive material surrounding the bais winding to shield the bias winding against alternating magnetic flux, and the arrangement being such that one of the two parallel sides of the loop of each screened bias winding passes through aligned windows of two of the iron-cored saturable reactors which are spatially parallel to one another while the other of the parallel sides passes through the other windows of the said two reactors.

2. A current-limiting device as claimed in claim 1 for a multiphase system, the device comprising at least two superconducting direct current bias windings, one iron-cored saturable reactor carrying one of the two alternating current windings associated with one phase of the alternating current system being linked by a first superconducting direct current bias winding and a further iron-cored saturable reactor carrying the second of the two alternating current windings associated with that phase of the alternating current system being linked by a second superconducting direct current bias winding.

3. A current-limiting device as claimed in claim 2 for a three phase system having six iron-cored saturable reactors in two sets of three, the three reactors of each set being in spatially parallel relation and being linked by a respective one of two bias windings, and each phase comprising an alternating current winding of a reactor of each set.

4. A current-limiting device as claimed in claim 1 in which the said two reactors carrying the alternating current windings of one phase are linked by a common superconducting bias winding.

5. A current-limiting device as claimed in claim 4 for a three phase system in which six iron-cored saturable reactors are arranged in spatially parallel relationship and linked by a single superconducting bias winding loop, each phase including a pair of reactors with connected alternating current windings.

6. A current-linking device as claimed in claim 4 for a multiphase system having a separate superconducting bias winding for each phase.

* * * * *